US006435019B1

(12) United States Patent
Vojtisek-Lom

(10) Patent No.: US 6,435,019 B1
(45) Date of Patent: Aug. 20, 2002

(54) PORTABLE ON-BOARD SYSTEM FOR MEASURING VEHICLE EXHAUST PARTICULATE EMISSIONS

(75) Inventor: Michal Vojtisek-Lom, Pittsburgh, PA (US)

(73) Assignee: Clean Air Technologies International, Inc., Buffalo, NY (US)

(*) Notice: Subject to any disclaimer, the term of this patent is extended or adjusted under 35 U.S.C. 154(b) by 0 days.

(21) Appl. No.: 09/551,067

(22) Filed: Apr. 18, 2000

(51) Int. Cl.[7] ............................................. G01M 19/00
(52) U.S. Cl. ..................................................... 73/118.1
(58) Field of Search ............................. 73/118.1, 23.31, 73/116, 117.3

(56) References Cited

U.S. PATENT DOCUMENTS

| | | | | |
|---|---|---|---|---|
| 5,099,683 A | * | 3/1992 | Remboski, Jr. et al. | 73/116 |
| 5,222,471 A | * | 6/1993 | Stueven | 123/695 |
| 5,717,130 A | | 2/1998 | Xu et al. | |
| 5,750,886 A | * | 5/1998 | Lambert et al. | 73/117.3 |
| 5,898,107 A | | 4/1999 | Schenk | |
| 6,112,575 A | * | 9/2000 | Cocconi | 73/118.1 |
| 6,148,656 A | * | 11/2000 | Breton | 73/118.1 |

OTHER PUBLICATIONS

Michal Vojtisek–Lom and James T. Cobb, Jr., Vehicle Mass Emissions Measurement Using Portable 5–gas Exhaust Analyzer and Engine Computer Data, presented at Emission Inventory: Planning for the Future Conference, Research Triangle Park, North Carolina, Oct. 28–30, 1997.
Michal Vojtisek–Lom and James T. Cobb, Jr., On–road Light–duty Vehicle Emission Measurements Using a Novel Inexpensive On–board Portable System; presented at the Eighth CRC On–road Vehicle Emissions Workshop, San Diego, California, Apr. 20–22, 1998.
Michal Vojtisek–Lom and James T. Cobb, Jr., Measurement, Variance and Reduction of Real–world Emissions of 20 Dedicated CNG Vans; presented at Air & Waste Management Association Annual Meeting, San Diego, California, Jun. 14–18, 1998.
Michal Vojtisek–Lom and James T. Cobb, Jr., Using a Portable On–board Emissions Measuring System to Evaluate Alternative Fuel Vehicles, presented at Joint Summer Meeting, Transportation Research Board, Ann Arbor, Michigan, Aug. 2–4, 1998.

* cited by examiner

*Primary Examiner*—Benjamin R. Fuller
*Assistant Examiner*—Maurice Stevens
(74) *Attorney, Agent, or Firm*—Phillips, Lytle, Hitchcock, Blaine & Huber LLP

(57) ABSTRACT

The invention is directed to an improved mass emissions measuring system (15) for an internal combustion engine (17). In the preferred embodiment, the system is comprised of a particulate monitor (16), four sensor (18, 22, 23 or 29) which may be temporarily attached to the engine for sensing operating parameters of the engine, an engine-control interface (21), a processor (19) programmed to collect and manipulate data from the monitor and the sensors and/or engine-control interface, a display (20) for displaying the particulate emissions of the engine, an exhaust sampling system (31) which is adapted to be temporarily connected between the exhaust system of the engine and the particulate monitor, and an opacity meter (56 or 58). The particulate monitor may comprise a first photometer (46), a second photometer (48), an impactor (45) located upstream from the second photometer, whereby the impactor limits the size of particulates in the exhaust of the engine communicating with the second photometer, and a microbalance (59) adapted to measure the mass of the particulate matter in the exhaust communicating with the photometer. The system is adapted for use on-board a moving vehicle.

34 Claims, 5 Drawing Sheets

PORTABLE ON-BOARD SYSTEM FOR MEASURING VEHICLE EXHAUST PARTICULATE EMISSIONS

FIELD OF THE INVENTION

The present invention relates generally to the field of vehicle emissions measuring systems and, more particularly, to an improved on-board exhaust particulate measuring system.

BACKGROUND ART

Motor vehicle emissions are the leading source of air pollution in most metropolitan areas, causing health, ecological and economical damage. As a result, considerable effort and resources are currently devoted to various emission reduction strategies, such as emission inspection programs, reformulated or alternative fuels, stricter standards for new vehicles, mass transit, improved engine control and catalyst technologies, and upgrade and repair of existing vehicles. However, in order to evaluate the impact of these reduction strategies, it is necessary to measure and collect accurate real-world emission measurements over the life of a vehicle.

Presently, the vast majority of emission tests are performed in a specialized laboratory, where the vehicle is driven on a dynamometer according to a prescribed driving cycle, such as I/M 240 or FTP for light and medium duty vehicles and CBD for heavy duty vehicles.

This approach has several significant disadvantages. First, the driving cycles do not adequately represent real-world driving conditions, which vary and are often unknown. Second, vehicles can be optimized for low emissions during the driving cycle, but do not operate optimally in actual use. Third, the testing equipment is bulky and expensive. Fourth, there are significant costs associated with testing the vehicle, such as vehicle (and/or mobile laboratory) mileage, vehicle downtime, and the test it-self, especially on heavy-duty vehicles. Fifth, individual vehicle engines have unique characteristics which effect emissions and cause variations between vehicles. Sixth, only a relatively small number of vehicles are being tested.

The first two disadvantages can be eliminated by using a capable testing system installed in the vehicle. Such systems can be classified into four categories: (1) laboratory-grade instruments permanently installed into dedicated instrumented vehicles (2) repair-grade gas analyzers used primarily by automotive technicians and providing only a rough estimate of mass emissions for repair purposes, (3) portable, on-board mass emissions monitoring systems, such as a system previously disclosed by the inventor, and (4) portable on-board mass emissions monitoring systems, such as the one disclosed in U.S. patent application Ser. No. 09/359,984, the aggregate disclosure of which is incorporated herein by reference.

Systems of the type in the first category lack the portability necessary to test a wide range of vehicles. Systems of the type in the second category are capable of only monitoring concentration of pollutants in the exhaust gas, and therefore lack the capability of accurately measuring and calculating mass emissions.

Systems of the type in the third category employ a five-gas analyzer drawing undiluted exhaust from the tailpipe and calculate mass exhaust flow from engine operating data obtained via a diagnostic link to the engine control unit. The system disclosed in U.S. patent application Ser. No. 09/359,984 describes two novel methods of exhaust mass flow monitoring. The first method uses an array of sensors temporarily mounted to a spark ignition engine to provide the necessary engine operating data. The second uses an inert gas injection system, where the exhaust flow is inferred from the dilution ratio from a small, known amount of inert gas injected into the exhaust system upstream from the sampling point.

However, even these two systems have certain limitations. First, the sensor array employed uses an inductive pickup to measure engine rpm on spark ignition engines, and is therefore not suitable for use with compression ignition engines such as diesel engines. While mass exhaust flow can still be measured in a diesel engine using the second approach, namely, with an inert gas injector, this approach is likely to require small modifications to the vehicle, such as drilling a hole into the exhaust system. Third, these systems are not capable of accurately measuring particulate material in emissions. This is in large part because the sampling methodology does not allow for the iso-kinetic sampling of particulate matter and for the dilution of the sample necessary for an accurate particulate matter emissions measurement.

Finally, it is known that emissions can be sampled using a proportional sampling system, which is a sampling system in which the sampling rate is proportional to the exhaust flow. However, this type of system requires the installation of a bulky proportional sampling system to the end of the tailpipe, and thus its use and portability is limited by the design of the vehicle and its exhaust system.

Hence, it would be useful to provide a portable, on-board mass emissions monitoring system which could be used on heavy-duty diesel engines and would allow for on-board measurement of mass gaseous as well as particulate matter emissions.

DISCLOSURE OF THE INVENTION

With parenthetical reference to the corresponding parts, portions or surfaces of the disclosed embodiment, merely for the purposes of illustration and not by way of limitation, the present invention provides an improved mass emissions measuring system (15) for an internal combustion engine (17), comprising a particulate monitor (16), at least one sensor (18, 22, 23 or 29) which may be temporarily attached to the engine for sensing operating parameters of the engine, and a processor (19) programmed to collect and manipulate data from the monitor and the sensor, whereby the particulate emissions of the engine may be calculated.

The system may further comprise a display (20) for displaying the particulate emissions of the engine, an exhaust sampling system (31) which is adapted to be temporarily connected between the exhaust system of the engine and the particulate monitor, and/or an opacity meter (56 or 58). The particulate monitor may comprise a first photometer (46), a second photometer (48), and an impactor (45) located upstream from the second photometer, whereby the impactor limits the size of particulates in the exhaust of the engine communicating with the second photometer. The system may further comprise a microbalance (59) adapted to measure the mass of the particulate matter in the exhaust communicating with the photometer. The sensor may be capable of sensing engine rpm, engine oil temperature, intake manifold pressure, or intake air temperature. The particulate monitor may be capable of measuring particulate mass, particulate surface area, particulate count, or the opacity of the emissions from the engine. The system may be adapted for use on-board a moving vehicle. The present invention also discloses a portable mass emissions measuring system for an internal combustion engine comprising a particulate monitor, an engine-control interface (21), and a processor programmed to collect and manipulate data from the monitor and the engine-control interface, whereby the particulate emissions of the engine may be calculated.

Accordingly, the general object of the present invention is to provide an improved mass emissions measuring system which is adapted to be used to determine real-world vehicle emissions.

Another object is to provide an improved emissions measuring system for determining particulate emissions of a vehicle.

Another object is to provide an improved emissions measuring system which is portable.

Another object is to provide an improved emissions measuring system which is designed for use on a wide variety of vehicles.

Another object is to provide an improved emissions measuring system which may be used on a vehicle without permanent modification to the vehicle.

Another object is to provide an improved emission measuring system which can be installed for use on a vehicle in a very short period of time.

Another object is to provide an improved emissions measuring system which may be used without displacing a vehicle from service.

Another object is to provide an improved emissions measuring system which allows for use with a large number of vehicles.

Another object is to provide an improved emissions measuring system which may be used to test large numbers of vehicles in a short period of time.

Another object is to provide an improved emissions measuring system which may be used on vehicles which do not have an engine electronic control unit.

Another object is to provide an improved emissions measuring system which has improved accuracy in measuring particulates.

DESCRIPTION OF THE PREFERRED EMBODIMENTS

Figure 1:
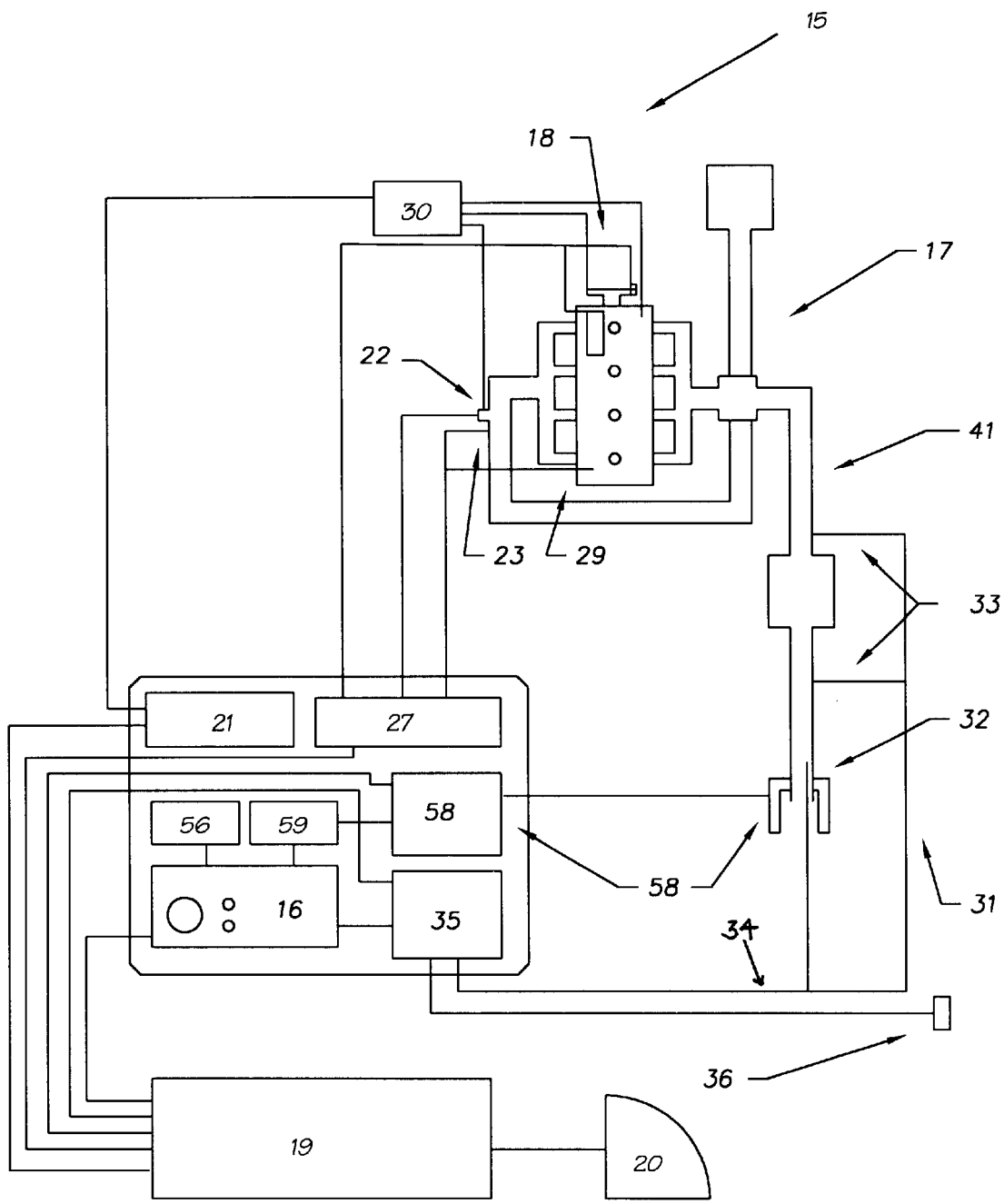
FIG. 1 is a complete schematic of the emissions measuring system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or access of rotation, as appropriate.

Referring now to the drawings and, more particularly, to FIG. 1 thereof, this invention provides an improved portable particulate emissions measuring system, of which the presently preferred embodiment is generally indicated at 15. The system is shown as broadly including a particulate monitor 16, four engine sensors 18, 22, 23 and 29, a sensor data acquisition interface 27, an engine control interface 21, and a processor 19.

Processor 19, particulate monitor 16, data acquisition interface 27, and engine control unit interface 21 are enclosed in a single aluminum housing 37, which is vented for heat dispersion and adapted for placement on the seat, on the floor, or on any other suitable horizontal surface inside the vehicle.

Figure 2:
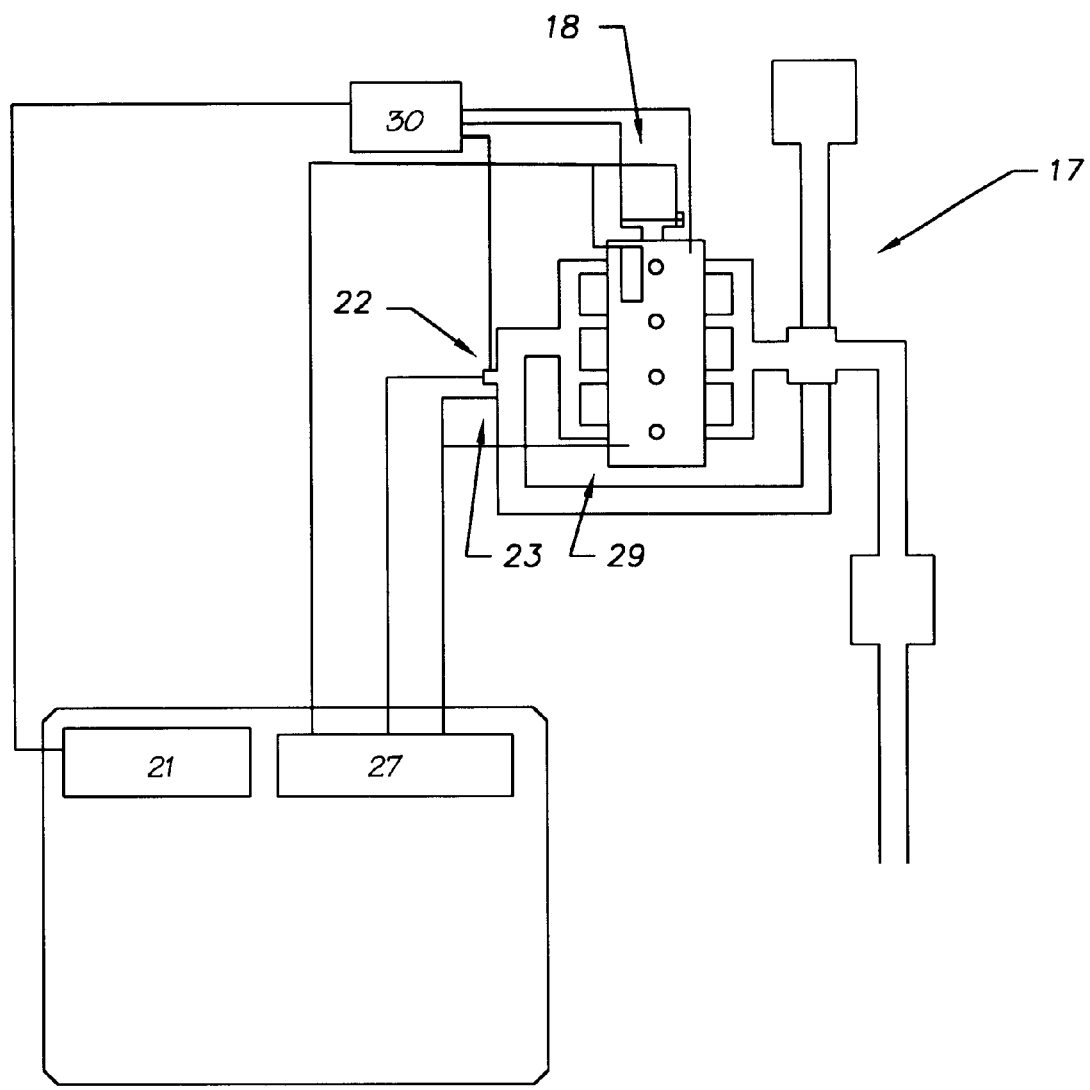
FIG. 2 is a partial schematic of the emissions measuring system, showing the sensor array temporarily mounted to the engine and the engine control unit and interface.

As shown in FIG. 2, in engines which are not computer controlled or for which the computer does not provide the necessary data, engine rpm, intake manifold pressure, engine oil temperature, and intake air temperature are measured using engine rpm sensor 18, intake manifold pressure sensor 22, oil temperature sensor 29, and intake air temperature sensor 23. Sensors 18, 22, 29, and 23 are adapted to be temporarily mounted to the engine during testing. Data acquisition interface 27 is a conventional A/D converter which converts analog input from the sensors to digital output. In the preferred embodiment, engine rpm sensor 18 is a phototachometer. The phototachometer includes a reflective surface which is temporarily affixed to the crankshaft or other rotating part of the engine. A light source and a light detector are then positioned such that each time the rotating part completes a full turn, the light hits and is reflected from the reflective surface on the rotating engine part and is detected by the detector.

It is contemplated that alternative rpm sensors may be used. For example, engine rpm sensor 18 may be a Hall effect sensor, which employs a magnetic strip temporarily attached to the crankshaft or other rotating part of the engine and a detector. The detector is arranged such that it provides a signal each time the magnetic strip on the rotating part of the engine completes a full turn. Alternatively, engine rpm sensor 18 may be a vibrational detector, which senses engine vibrations. This signal may then be converted electronically to an rpm reading.

Manifold pressure sensor 22 is a manifold absolute pressure transducer which is connected to the intake air manifold of the engine and senses the manifold absolute pressure in the manifold. On turbocharged engines, pressure sensor 22 is placed downstream of the turbocharger.

Intake air temperature sensor 23 is connected in a similar position to manifold pressure sensor 22. Intake air temperature sensor 23 is a conventional temperature measuring device which is capable of sensing intake air temperature.

Intake oil temperature sensor 29 is a conventional dipstick temperature probe which is inserted in place of the oil dipstick.

As also shown in FIG. 2, in computer controlled engines where engine data can be obtained by an engine diagnostic link, intake air flow or fuel flow is computed from the engine data obtained by engine control interface 21. Because modern computer-controlled engines provide operating data such as vehicle speed, engine rpm, intake air and coolant temperature, intake air pressure, intake air mass flow, throttle position and engine load to an engine control unit 30, this information can be fed to processor 19 by engine control interface 21. The Pro-Link 9000 scan tool with heavy-duty cartridge manufactured by Microprocessor Systems Inc. of Sterling Heights, Mich. may be employed in the preferred embodiment.

Processor 19 is programmed to use data from engine control unit 30 to compute intake air mass flow. As mentioned above, in most modern engines, intake air mass flow and/or fuel flow can be obtained from engine electronic control unit 30 using engine control interface 21. On throttled (such as gasoline powered) engines, the intake air flow ($MF_i$) is usually determined by the formula:

$$MF_i \text{ [mol/s]} = \left( \frac{\frac{(\text{Adjusted MAP}[kPa])(\text{Engine displacement}[\text{liters}])(\text{engine speed}[\text{rpm}])}{30(\text{engine cycle})}}{8.314(\text{Intake air temp.}[\text{deg. C.}] + 273)} \right) VEF$$

MAP is the manifold absolute pressure and the engine cycle will be either 2 or 4. VEF is the volumetric efficiency multiplier, denoting an overall engine volumetric efficiency at full throttle. A value of 0.95 is used as a default for modern engines.

$$\text{Adjusted MAP} = \text{Measured MAP} - \frac{\text{Atmospheric pressure}}{\text{Engine compression ratio}}$$

If the intake air temperature is not available, it is approximated by the arithmetic average of oil temperature and ambient air temperature. Some engines report intake air mass flow directly in grams per second.

On naturally aspirated diesel engines, atmospheric pressure is used instead of Measured MAP. On turbocharged engines, Measured MAP can be substituted with the sum of the atmospheric pressure and turbo boost, where turbo boost is the difference between the intake manifold pressure and atmospheric pressure.

Fuel flow can be obtained either directly as a mass or volume per unit of time (such as on some heavy-duty diesel engines), or calculated from a formula:

$$FuelFlow = (\text{Injector displacement})(\text{number of cylinders})\left(\frac{\text{Engine rpm}}{30(\text{engine cycles})}\right)$$

Injector displacement is the amount of fuel injected by one injector during one engine cycle. Injector displacement is directly proportional to the injector pulse width, reported by many newer engines. The proportion constant may be obtained from the vehicle manufacturer or determined.

As shown in FIG. 1, sensors 18, 22, 23 and 29, engine control interface 27 and particulate monitor 16 are connected to processor 19 via a serial (RS-232) port. An Axiom P-1000 panel PC may be used in the preferred embodiment. The present system uses software to simultaneously receive both sets of data. The data is parsed, a system time stamp and the most recent tag is added to each complete record, and each record is stored in computer memory.

Figure 3:
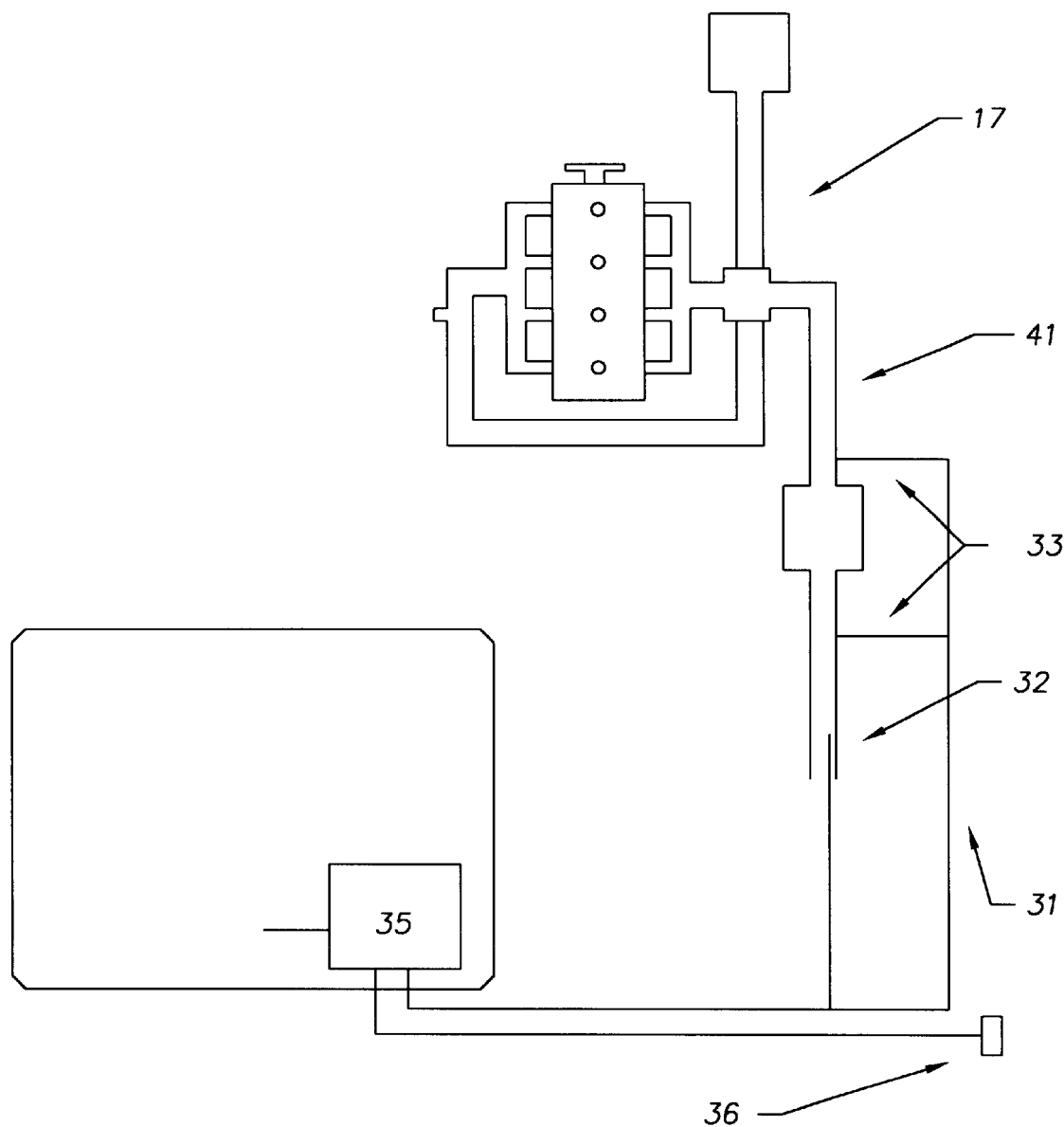
FIG. 3 is a partial schematic of the emissions measuring system, showing the sampling system.
Figure 4:
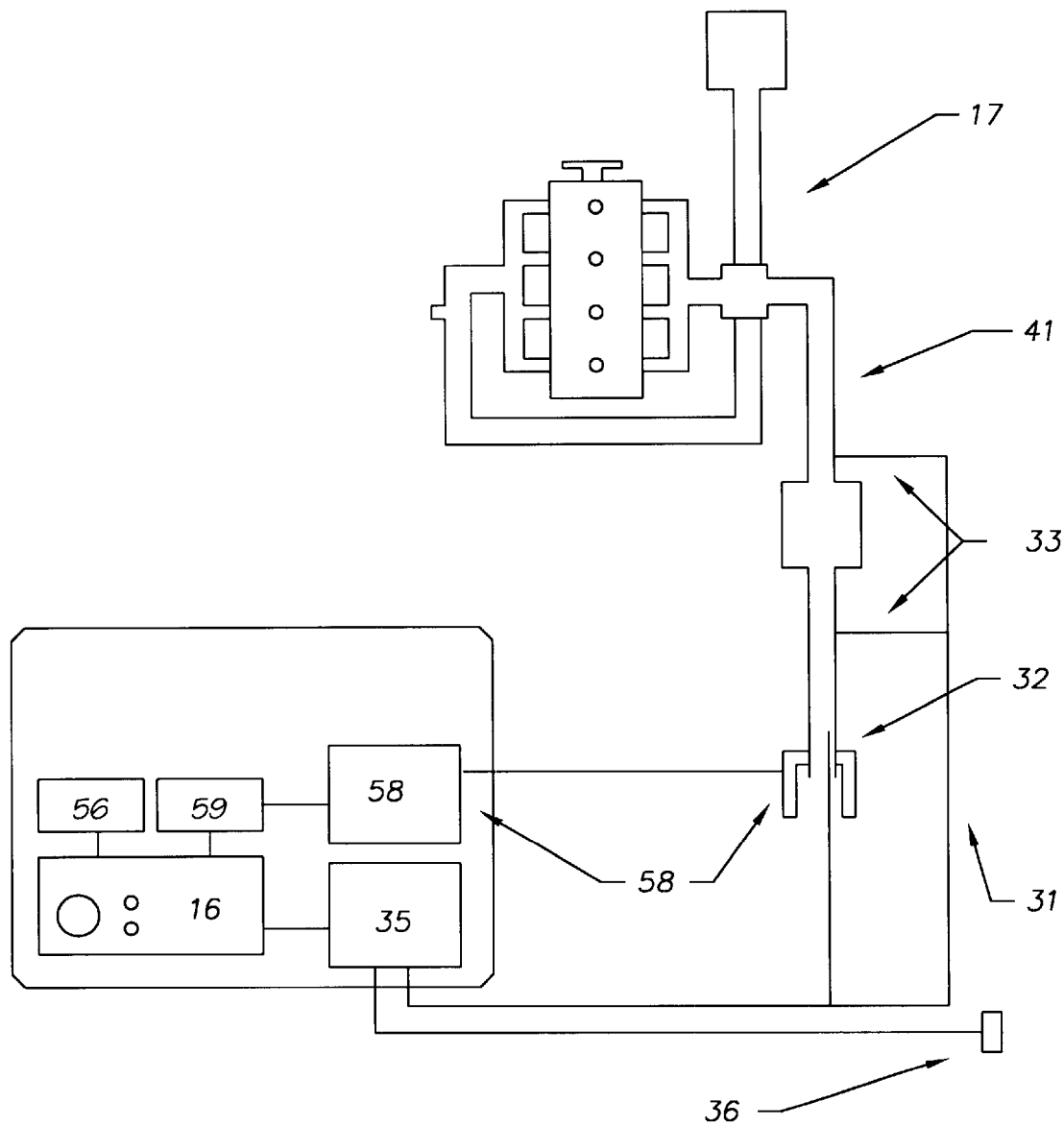
FIG. 4 is a partial schematic of the emissions measuring system, showing the particulate monitoring system.

Particulate monitor 16 is designed to provide qualitative and/or quantitative particulate matter emissions measurements. Particulate monitor 16 operates in conjunction with exhaust sampling system 31. As shown in FIGS. 3 and 4, exhaust sampling system 31 includes sampling probe 32, alternate sampling probe 33, sampling line 34, dilution system 35, and zero air intake 36. In the preferred embodiment, a sample of raw undiluted vehicle exhaust is collected through a 12 inch sampling probe 32 inserted into the tailpipe and secured by a clamp. Alternatively, sampling probe 33 may be inserted into a temporary sampling port drilled into the exhaust pipe 41. The sample is drawn perpendicular to the laminar flow of exhaust at a rate of 0.1–0.2 liters per second, depending on the configuration of the monitoring system.

An isokinetic sampling system, in which the samples are drawn in the same direction and at the same speed as that of the laminar exhaust flow, is not necessary in this invention, as diesel exhaust particles are sufficiently small (<1 $\mu$m in diameter) to obtain a representative sample without isokinetic sampling. The sample is drawn perpendicular to the laminar flow of exhaust, with the purpose of excluding relatively large (greater than 1 $\mu$m in diameter) road dust and engine wear particles.

An electrically conductive sample line 34 is used to prevent the electrostatic deposit of particles in the sampling system. The sample line is not heated. While use of an unheated line is likely to cause condensation in the line, thereby possibly reducing the accuracy of the measurement, the power consumption of the heated line would necessitate the use of an external power source, such as a battery, and reduce the portability of the system.

In the preferred embodiment, the exhaust remains undiluted and the measuring instruments are adapted to operate with undiluted exhaust. However, the invention does provide for the inclusion of a dilution system 35 when such dilution is necessary. When exhaust dilution is necessary, the sample is routed through metric dilution system 35. Dilution system 35 mixes the exhaust with filtered and particulate-free zero air at a predetermined dilution ratio. Zero air is provided through zero air intake 36. A suitable miniature dilution system is the MD19-1E, available from EcoChem Analytics of West Hills, Calif. The dilution system is positioned upstream of the instruments requiring a diluted sample.

Figure 5:
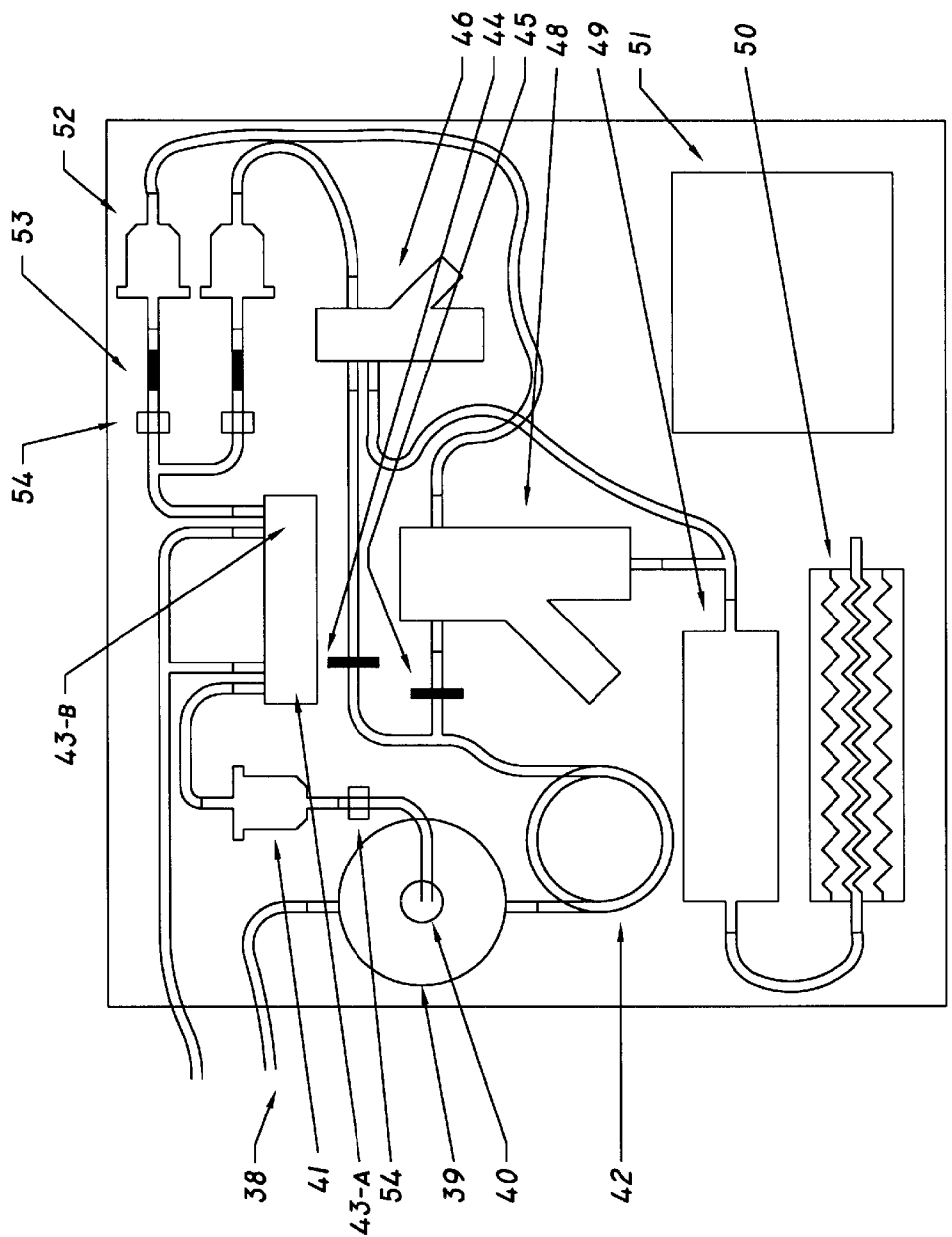
FIG. 5 is a schematic of the particulate monitor.

As shown in FIG. 5, particulate monitor 16 includes a sample input line 38, a condensate bowl 39, a condensate outlet 40, condensate filter 41, sample heater 42, sample pump 43, first impactor 44, second impactor 45, first photometer 46, second photometer 48, particulate filter 49, air drier 50, control box 51, particulate filters 52, critical orifices 53, and a number of check valves, severally indicated at 54.

Sample input line 38 connects with sampling line 34. As shown, particulate monitor 16 draws the sample from sampling system 31 through sampling input line 38 and into condensate bowl 39. Condensate bowl 39 has an inlet at the top and two outlets, top and bottom. Condensate bowl 39 operates much like condensate bowls found in compressed air systems and is used to collect condensed vapors at the bottom of the bowl.

From condensation bowl 39, a mixture of condensate and sample is drawn at a rate of approximately a quarter of the total sample flow through condensate outlet 40, through condensate filter 41, and into the wet side 43$a$ of sample pump 43, where it is expelled from the system. Condensate filter 41 is a disposable particulate filter, such as an automotive fuel filter, which operates to prevent the accumulation of particulate matter in sample pump 43.

Condensate-free sample exhaust is drawn from condensate bowl 39 at a rate of approximately three quarters of the total sample flow through sample heater 42. Sample heater 42 raises the temperature of the sample, which reduces the relative humidity of the sample and prevents condensation from forming. Sample heater 42 consists of loops of the sampling line elongated around a heated bulb.

After being heated, the sample flow is divided, with one portion of the sample passing through first impactor 44 and the other portion passing through second impactor 45. First and second impactors 44 and 45 are designed to trap particles larger than a predetermined diameter, thereby limiting the size of the particles entering photometers 46 and 48, respectively. Impactor 44 has a large cut-off diameter (0.5–1.0 μm) and impactor 45 has a smaller cut-off diameter (0.2–0.5 μm).

As shown in FIG. 5, first impactor 44 and second impactor 45 are positioned upstream of first photometer 46 and second photometer 48, respectively. Photometers 46 and 48 are light scattering measurement devices. Each light scattering device consists of an enclosure which houses a laser light source pointed into the flow of the sample and a light detector mounted at an angle to the laser beam. The detector measures the intensity of the light scattered by particles within the sample. Photometer 46 has a low intensity laser (5 mW) and is intended to be used downstream from impactor 44. Alternatively, photometer 46 may be used without an upstream impactor. Photometer 46 measures the overall light-scattering ability of the sample, which is primarily determined by the light scattering caused by the larger particles in the sample. Photometer 48 has a high-intensity light source (15 mW) and is intended to be used downstream from impactor 45. Photometer 48 measures the light scattering caused by the smaller particles in the sample.

To protect the optics of the photometer, and to prevent deposition of particulate matter within the photometer, a sheath of air is drawn into the photometer enclosure along with the sample such that the sample is contained and surrounded by a cylinder of air. This air is ambient air, drawn through sample dryer 50 and a HEPA particulate filter 49. Dryer 50 and filter 49 assure that the sheath of air is particle-free and has low relative humidity. The intensity of the light sources and the detector signal are analyzed by control unit 51, which provides voltage signals to processor 19.

The relationship between the light scattering caused by particles in the sample and particulate mass emissions is highly dependent on the particle size distribution of the sample. For example, the particle size distribution of emissions from a diesel engine is dependent on the engine design, age, mechanical condition, operating conditions, and fuel characteristics, and is often difficult to predict. However, the simultaneous use of two photometers allows for a qualitative determination of the particle size distribution, which, in turn, allows for a more accurate quantitative determination of particulate mass emissions.

The sample is drawn from photometers 46 and 48 through particulate filters 52, critical orifices 53, check valves 54 and into dry side 43b of pump 43. The sample is then exhausted from monitor 16. Filters 52 are commercially available automotive filters and prevent the accumulation of particulate matter within the sampling pump. Orifices 53 provide a maximum limit to the flow rate and prevent the flow from becoming turbulent as it passes through photometers 46 and 48. Check valves 54 prevent back-flow.

In the preferred embodiment, suitable photometers 46 and 48, control unit 51, and critical orifices 53 may be adopted from the 8100 series particle filter tester manufactured by TSI, Inc. of St. Paul, Minn. Examples of suitable impactors 44 and 45, and dryer 50 are also manufactured by TSI, Inc. The sample pump manufactured by Hargraves Technology Corporation of Mooresville, N.C., is an example of a suitable pump 43 in the preferred embodiment.

It should be noted that the relationship between the response of the light scattering monitors and the total particulate mass is dependent on the properties (such as size, distribution or chemical composition) of the measured exhaust, and can be extremely difficult to describe mathematically. Rather, this relationship should be determined by comparing the instrument response to the emission rates obtained using (1) the traditional test methods, and/or (2) using high quality laboratory grade instruments. This comparison should be done on a variety of diesel engines. In a preferred embodiment, the processor 19 uses a knowledge based expert system to determine total particulate mass from the readings of first and second photometers 46 and 48.

As shown in FIG. 4, in the preferred embodiment, a partial flow opacity meter 56 may be added to particulate monitor 16. Opacity meter 56 measures the extinction of light passing through the sample. The LCS-2000 opacity meter provided by Sensors, Inc. of Saline, Mich., is an example of a suitable partial flow monitor. In an alternative embodiment, a full flow opacity meter 58 may be used. Opacity meter 58 consists of a light source, a detector, and a mounting system which allows the light sensor and detector to be mounted on the end of the tailpipe of a vehicle. A control unit provides the opacity readings to processor 19. An example of a suitable full-flow opacity meter is Wager Model 6500 provided by Robert H. Wager Co., Inc., of Rural Hall, N.C.

The function of opacity meter 56 is to complement the light scattering readings in order to improve the accuracy of the system. However, it is contemplated that in some cases opacity readings alone will be sufficient to provide a qualitative, and to some extent quantitative, particulate mass emission measurements. An emission inspection test, the goal of which is to simply identify vehicles with extremely high emissions, is an example of such a case.

The simultaneous use and output from light scattering photometers 46 and 48 and opacity meter 56 or 58 may be used to qualitatively differentiate between elemental carbon particles (soot) and organic carbon (condensed organic compounds), based on the large difference in the light absorption capabilities between the elemental and organic carbon particles.

In the preferred embodiment, particulate monitor 16 may also include the addition of a tapered element oscillating microbalance 59. A suitable oscillating microbalance 59 is the TEOM diesel particulate monitor provided by Rupprecht & Patashnick Co., Inc. of Albany, N.Y. This device directly measures total particulate mass by depositing particulates on a filter which is attached to an oscillating element. The total filter mass is determined from the frequency of the natural oscillation of the element. With the addition of microbalance 59, the conversion factor between light scattering and particulate mass may be more accurately determined by comparing the particulate mass measurements derived from the photometer readings, including indicated particle size distribution, with the particle mass emissions from microbalance 59. This conversion factor may then be applied to the real-time emissions data obtained from particulate monitor 16 to determine a more accurate measurement of particulate mass emissions.

This invention contemplates that a number of alternatives and/or additions to the particulate monitor 16 disclosed in the preferred embodiment may be used. For example, a condensation particulate counter (CPC) of the type provided by TSI, Inc. may be used to measure particulate count. A photoelectric aerosol sensor, such as the PAS-2000 available from EcoChem Analytics, may be used to measure the concentrations of particle-bound aromatic hydrocarbons. An aerodynamic time-of-flight particle sizer, available from TSI, Inc., may be used to obtain a particle size distribution. Also, an oscillating microbalance diesel particulate monitor such as the TEOM manufactured by Rupprecht & Patashnick Co. may be used to provide total particulate mass. A photo-acoustic particulate detector, an X-ray diffraction detector, an electrostatic impactor, and other similar devices may be used as part of the particulate monitor 16 for monitoring different properties of the particulate matter in the subject exhaust.

The readings from particulate monitor 16 are transmitted to processor 19, where they are converted into particulate count, surface area, or particle mass per second units. Given a known sampling rate, readings given per second are converted into count, surface area or particle mass per volume of sample. Conversion factors, derived from manufacturer or scientific literature, may be used to convert the reading of the monitor into the desired parameters.

While in the preferred embodiment one of the above approaches is used to determine particulate concentrations, in an alternative embodiment several of the monitors of the same or different type may be used in series if the monitor does not collect or alter the particles. These different types of monitors may be used in series with filters, impactors or other devices which limit the maximum diameter of the passing particles placed upstream of each monitor, with the purpose of limiting the maximum particle diameter flowing through the monitor.

Processor 19 is programmed to synchronize the data received. For example, sensors 18, 22, 23 and 29, and particulate monitor 16 produce data with a certain delay (or response time), at a certain rate, and with gaps. Both the delay and the rate can be obtained from the instrument manufacturer and/or obtained experimentally. The gaps are caused by equipment malfunction or by events such as periodic zeroing of particulate monitor 16.

On each set of data, the delay is subtracted from the time stamp. Linear interpolation is then used to generate one record every second (or other set time interval). Small gaps (usually less than 3 seconds) in the data are filled using the linear interpolation. If a large gap exists, the data is marked as "missing". All data is then combined into one set, which includes vehicle speed and engine operating parameters, such as intake/fuel/exhaust flow, exhaust concentrations of gaseous pollutants and particulate matter in the exhaust.

To obtain mass emissions data, the sample to be analyzed must be drawn from a known flow of gas. Traditionally, dilution tunnels and constant volume samplers were used for this purpose. In the preferred embodiment, the system samples undiluted exhaust and measures the exhaust flow in real-time. To calculate exhaust flow, either intake mass air flow or fuel flow must be known. Also, vehicle speed is necessary for distance and real-time fuel economy (mpg) and emissions (grams/mile, grams/gallon) calculations. Additional data, such as engine temperature, throttle position, or air conditioning operation are useful in correlating emission data to particular operating conditions.

Particulate count, particulate surface area and particulate mass emissions per second are calculated using the following formula.

$$i\ E(PM_x)[Us^{-1}]=C(PM_x)[U\text{volume}^{-1}]*EF[\text{Volume } S^{-1}]*DR(PM_x)$$

U is the desired particulate mass ("PM") units (i.e., particulate count, particulate surface area, or mass units). $E(PM_x)$ is the emissions value for particles of a diameter smaller than X. $C(PM_x)$ is the relative concentration of the particles in the sample. EF is the exhaust flow at the time corresponding to $C(PM_x)$. $DR(PM_x)$ is the corresponding dilution ratio (DR=1 for undiluted exhaust).

The present invention contemplates that many other changes and modifications may be made. The particular materials of which the various body parts and component parts are formed are not deemed critical and may be readily varied.

Therefore, while the presently-preferred form of the emissions measuring system has been shown and described, and several modifications discussed, persons skilled in this art will readily appreciate that various additional changes and modifications may be made without departing from the spirit of the invention, as defined and differentiated by the following claims.

What is claimed is:

1. A portable mass emissions measuring system for an internal combustion engine, comprising:
    a particulate monitor;
    a sensor array which is temporarily attachable directly to said engine for sensing operating parameters of said engine;
    said sensor array comprising a first sensor which senses engine rpm, a second sensor which senses intake air temperature or a parameter for determining intake air temperature, and a third sensor which senses manifold pressure; and
    a processor programmed to collect and manipulate data from said monitor and said sensor array,
    whereby particulate emissions of said engine are calculated.

2. The emissions measuring system as set forth in claim 1, and further comprising a display for displaying the particulate emissions of said engine.

3. The emissions measuring system as set forth in claim 1, and further comprising an exhaust sampling system which is temporarily connectable between the exhaust system of said engine and said particulate monitor.

4. The emissions measuring system as set forth in claim 1, and further comprising an opacity meter which measures the opacity of the exhaust of said engine.

5. The emissions measuring system as set forth in claim 1, wherein said particulate monitor comprises a photometer.

6. The emissions measuring system as set forth in claim 5, wherein said particulate monitor comprises a second photometer.

7. The emissions measuring system as set forth in claim 6, wherein said particulate monitor comprises an impactor, said second photometer and said impactor are arranged in series, and said impactor is positioned upstream from said second photometer, whereby said impactor limits the size of the particulates in the exhaust of said engine which communicate with said second photometer.

8. The emissions measuring system as set forth in claim 5, and further comprising a microbalance which measures the mass of the particulate matter in the exhaust communicating with said photometer.

9. The emissions measuring system as set forth in claim 1, wherein said engine includes an intake air manifold and said third sensor senses manifold absolute pressure of said manifold.

10. The emissions measuring system set forth in claim 1, wherein said second sensor senses intake air temperature of said engine.

11. The emissions measuring system as set forth in claim 1, wherein said second sensor senses engine oil temperature.

12. The emissions measuring system as set forth in claim 1, wherein said monitor measures concentrations of particulate matter in said engine emissions.

13. The emissions measuring system as set forth in claim 1, wherein said monitor measures the real-time count of particulate matter in said engine emissions.

14. The emissions measuring system as set forth in claim 1, wherein said monitor measures the real-time mass of particulate matter in said engine emissions.

15. The emissions measuring system as set forth in claim 1, wherein said monitor measures the real-time total particulate surface area of particulates in said engine emissions.

16. The emissions measuring system as set forth in claim 1, wherein said monitor measures the opacity of said engine emissions.

17. The emissions measuring system as set forth in claim 1, wherein said monitor, said sensor array and said processor are configured and arranged for use on-board a moving vehicle.

18. The emissions measuring system as set forth in claim 1, wherein said second sensor senses engine coolant temperature.

19. The emissions measuring system as set forth in claim 1, wherein said second sensor senses ambient air temperature.

20. A portable mass emissions measuring system for an internal combustion engine, comprising:
   a particulate monitor;
   said particulate monitor comprising a photometer:
   said photometer having a sample chamber, a light source directed into said sample chamber and a light detector which measures light scattering caused by particulates;
   an engine-control interface; and
   a processor programmed to collect and manipulate data from said monitor and said engine-control interface.

21. The emissions measuring system as set forth in claim 20, and further comprising an exhaust sampling system which is temporarily connetable between the exhaust system of said engine and said particulate monitor.

22. The emissions measuring system as set forth in claim 20, and further comprising an opacity meter which to measures the opacity of the exhaust of said engine.

23. The emissions measuring system as set forth in claim 19, wherein said particulate monitor comprises a second photometer.

24. The emissions measuring system as set forth in claim 23, wherein said particulate monitor comprises an impactor, said second photometer and said impactor are arranged in series, and said impactor is positioned upstream from said second photometer, whereby said impactor limits the size of the particulates in the exhaust of said engine which communicate with said second photometer.

25. The emissions measuring system as set forth in claim 19, and further comprising a microbalance which measures the mass of the particulate matter in the exhaust communicating with said photometer.

26. A method of calculating the mass emissions of an internal combustion engine, comprising the steps of:
   providing a sensor array;
   connecting said sensor array directly to said engine;
   providing a particulate monitor;
   connecting said particulate monitor to the exhaust of said engine;
   providing a processor;
   programming said processor to:
      read data from said sensor array and said particulate monitor;
      determine intake air temperature;
      determine intake air mass flow;
      determine exhaust mass flow;
      determine mass emissions.

27. The method as set forth in claim 26, and further comprising the steps of:
   determining engine oil temperature;
   determining ambient air temperature;
   wherein said intake air temperature is determined by averaging said engine oil temperature and said ambient air temperature.

28. The method as set forth in claim 26, and further comprising the steps of:
   determining engine coolant temperature;
   determining ambient air temperature;
   wherein said intake air temperature is determined by averaging said engine coolant temperature and said ambient air temperature.

29. The method as set forth in claim 26, wherein said processor is programmed to read particulate data from said particulate monitor and said exhaust mass flow is determined from said intake air mass flow and said particulate data.

30. The method as set forth in claim 29, wherein said mass emissions are determined from said exhaust mass flow and said particulate data.

31. The method set forth in claim 26, and further comprising the step of calibrating said data based on the predetermined delay time of said sensor array and said particulate monitor.

32. The method set forth in claim 26, wherein said particulate monitor comprises a photometer.

33. A particulate monitor comprising:
   a first photometer;
   a second photometer;
   said first and second photometer each having a sample chamber, a light source directed into said chamber, and a detector;
   said detector configured and arranged to measure intensity of light scattered by particulate matter in said chamber;
   an impactor;
   said second photometer and said impactor being arranged in series;
   said impactor positioned upstream of said second photometer such that said impactor limits the size of the particulate matter in exhaust of said engine communicating with said sample chamber of said second photometer.

34. The particulate monitor set forth in claim 33, and further comprising a microbalance which measures the mass of the particulate matter in the exhaust of said engine communicating with said first photometer.

* * * * *